May 3, 1938.  C. B. MATHEWS  2,116,464
CORE FOR USE IN THE MOLDING OF HOLLOW ARTICLES
Filed March 19, 1936   3 Sheets-Sheet 1
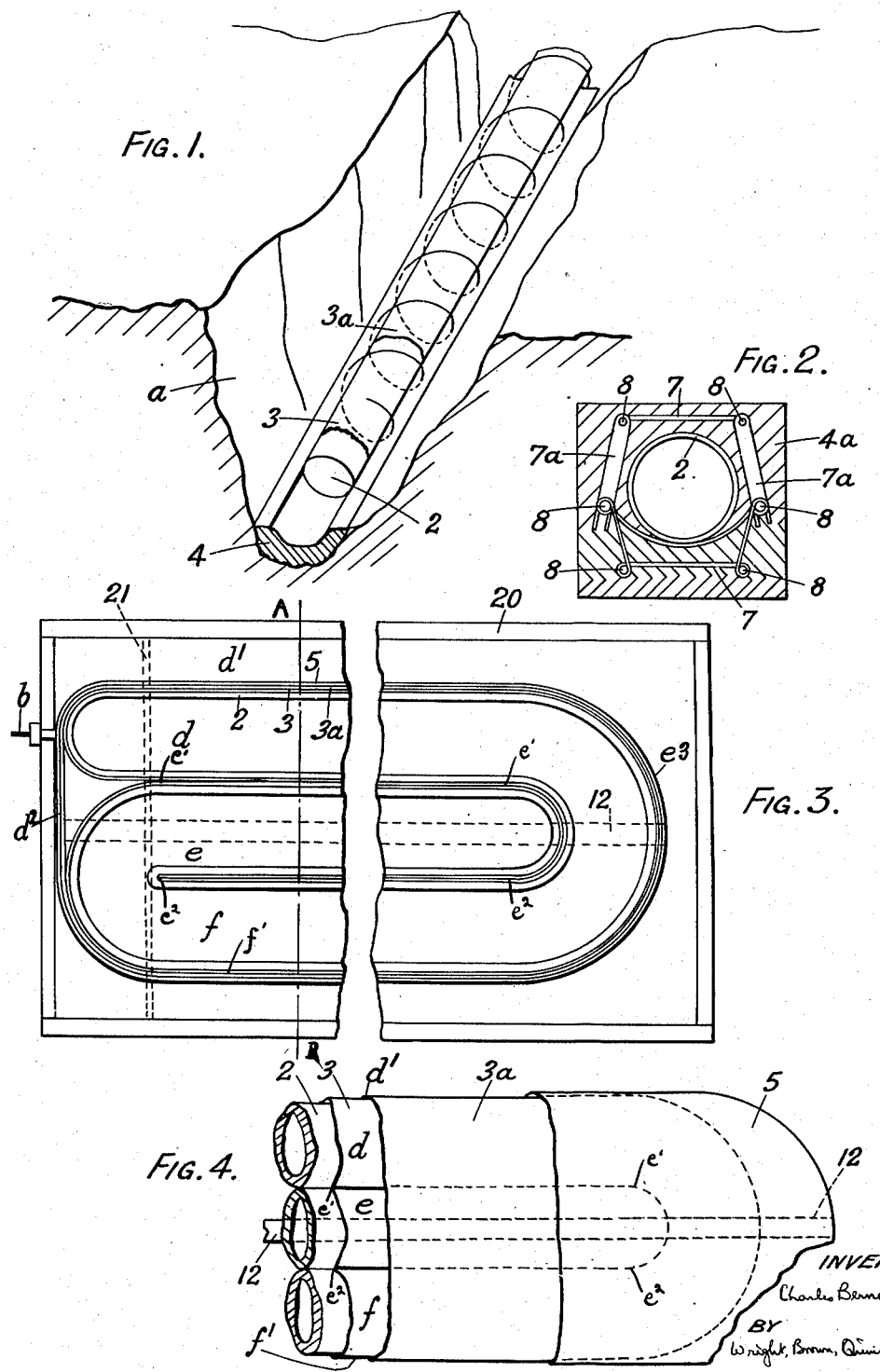

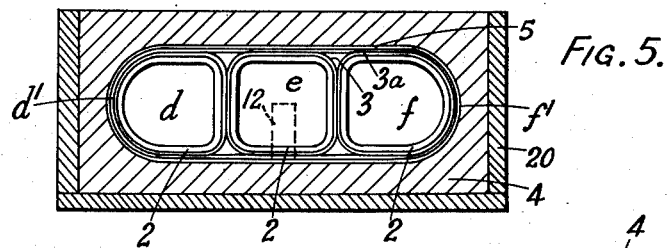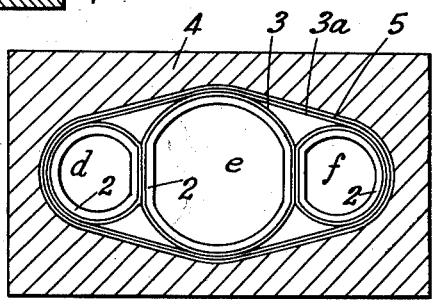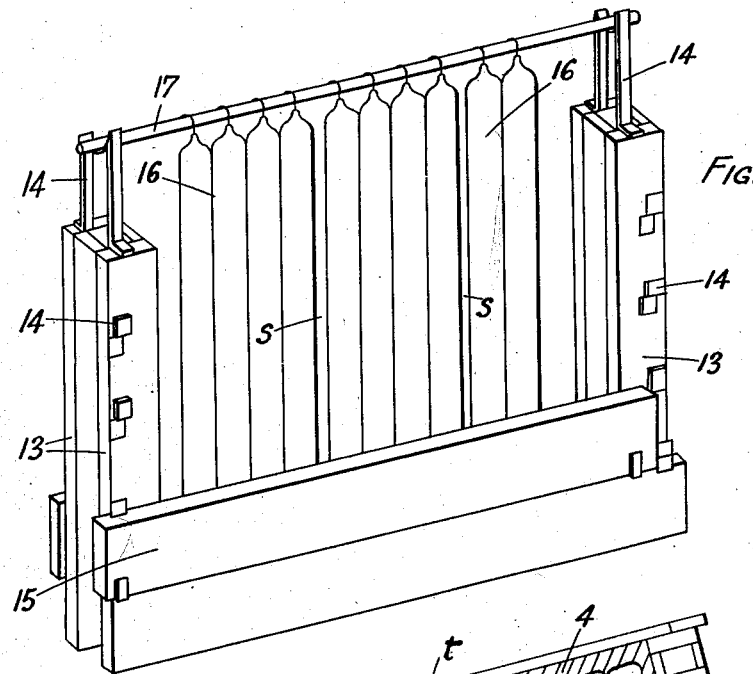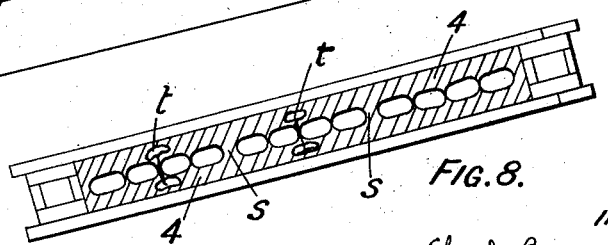

May 3, 1938.  C. B. MATHEWS  2,116,464
CORE FOR USE IN THE MOLDING OF HOLLOW ARTICLES
Filed March 19, 1936  3 Sheets-Sheet 3

INVENTOR
Charles Bernard Mathews
BY
Wright, Brown, Quinby May
ATTORNEY

Patented May 3, 1938

2,116,464

UNITED STATES PATENT OFFICE 2,116,464

CORE FOR USE IN THE MOLDING OF HOLLOW ARTICLES

Charles Bernard Mathews, Lobs Wood, Middleton, Ilkley, England, assignor of one-half to John Goldwell Ambrose, Beaconsfield, England Application March 19, 1936, Serial No. 69,650
In Great Britain April 4, 1935

3 Claims. (Cl. 25—128)

This invention relates to the construction of cores for use in the manufacture of hollow articles of concrete or the like, and consists in the employment of flexible material for constructing an outer covering or bag for enclosing an india-rubber tube which, when inflated, will make it assume the shape or contour of the desired space that it will leave when molded within the article produced. As for example the core may be cylindrical in cross section or rectangular or other shape in cross section, and the formation or construction of the flexible bag (which may be of woven cotton, or of canvas, or leather or like material) is such that when an elastic tube or tubes (as of india-rubber) is or are placed within the flexible bag and inflated or distended, the shape or contour which said expanding bodies assume will approximately fill the whole of the interior of the flexible bag to produce the effect desired, and such inflation or distension may be effected by air under pressure, steam under pressure, air or steam combined under pressure, or water or other liquid pressure may be employed.

The molding of articles of concrete or like material, as is well known, requires the hollow shape or contour and number of cores to fill the hollow spaces which they have subsequently to vacate so that the outside of said molded article will be of the desired shape, while the displacement of the core leaves it hollow for the sake of lightness and for other purposes in using the molded article as circumstances necessitate, such as the making of pipeways in the ground for the conveying of water or other liquid matter, gas or the like, the making of monoliths in molds, the building of walls, floors and ceilings of buildings, culverts or other formations, and further like structures.

In order that my said invention may be more easily understood I have hereunto appended sheets of drawings which, by letters and figures, reference is made in the following description:—

Fig. 1 is a perspective view which diagrammatically shows how a pipe may be formed in the ground with metal reinforcing means which will strengthen same circumferentially when completed.

Fig. 2 is an end elevation showing an opening made in a concrete block which is fortified with metal bars extending longitudinally through same.

Fig. 3 is a sectional plan of a core placed within a molding box, which core is intended to form the opening or hollow space to be left within a monolith formed in the usual manner and showing how I arrange for the tube to be inflated by the application of gas or liquid under pressure.

Fig. 4 is a diagrammatical view of a fragment, showing how the flexible material has to be formed to receive the inner inflating rubber tube to be expanded therein to produce the core as shown by Fig. 3.

Fig. 5 is a sectional end elevation on line A—B (Fig. 3) and as seen from left to right of said figure.

Fig. 6 is a similar end elevation of a section of a member of concrete with the addition of a shaped core produced as is hereinafter described.

Figs. 7 and 8 are elevation and sectional plan showing the method followed in using my cores to form the wall of a building.

Figure 9:
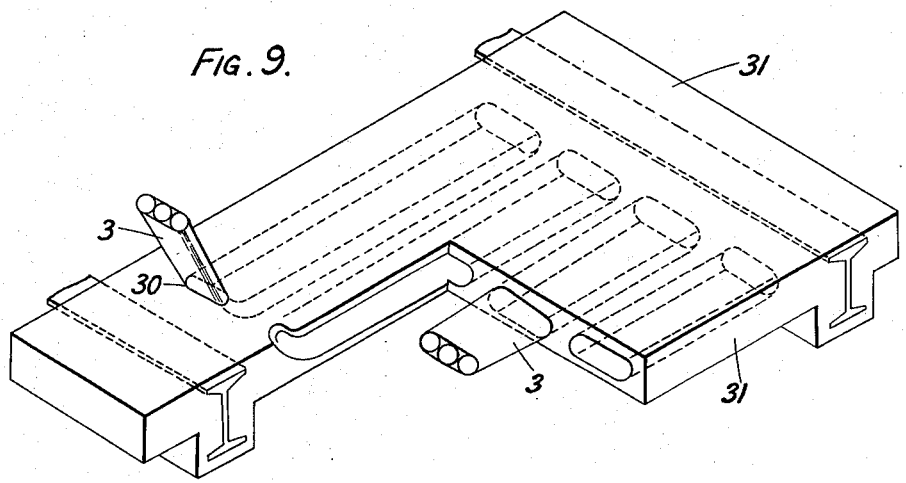
Fig. 9 is a perspective plan showing a fragment of a floor and ceiling of a room with our cores inserted and the concrete placed thereon as hereinafter described.

The formation of a core, according to my invention, in one of its simplest forms is to make such core perfectly cylindrical, inasmuch as the inner tube 2 of india-rubber takes the form of a cylinder when inflated and therefore the formation of my core for the purpose as shown by Fig. 1 only requires the restraining tube 3 to be also of flexible, non-elastic material, which, in this case, is of woven or like fibrous substance such as of cotton, flax, hemp or the like, and is made to extend from the open end shown in Fig. 1 the entire length and beyond the inner tube 2 of india-rubber.

The formation of the tube 3 may be effected by the process of weaving in well known manner, or it may be of appropriate width so that the two outer edges may be folded over and stitched together to form the restricting size of the tube. This tube is of sufficient diameter when inflated that it will restrict the full inflation of the elastic tube 2 to form the desired diameter of hole or opening in the concrete structure which is to be formed.

Taking over this tube 3 and extending in a similar manner the entire length of the tube 3 is another tube 3a secured to it with a final cover 5 of flexible material loosely placed over all the three (the tube 2 and two flexible tubes 3, 3a), and this cover (when the tubes within are inflated) will also be forced outwardly to assume the full size of the complete core.

In making use of the core thus produced and with a supply valve and coupling member b at one end thereof for the supplying and retaining of air or the like under pressure, I can then place at the base of the gutter a sufficient concrete to act as the base 4 of the final concrete member that has to be constructed within the gutter a, so that the core may be laid therein where, after the core has been expanded to the desired diameter, the remaining concrete may be filled into the gutter to cover or form the required enclosure of said core to complete the entire structure. After filling in, and after the fixing or hardening of the concrete above the core, I deflate or release said core of its entire internal pressure, thereby reducing its diameter and therefore rendering same free to be removed as desired.

This deflating of the core causes the inner casing of india-rubber 2 to bring with it the outer coverings 3 and 3a which enclose same, but does not bring with it the outermost covering 5 of the core, and same remains within the concrete structure to which it adheres.

After the whole removal of the core I then arrange a tape 12, hereinafter shown and described, having one end fixed to the end of the outermost core 5 so that I can then lay hold of the other end of this tape 12 and withdraw the inner cover 5 from its adhering position by causing its walls to roll inwardly from off the wall of concrete and the whole core may thus be withdrawn as is hereinafter more fully explained by reference to Fig. 10.

Provided the structure 4 of concrete has to be extended, before replacing the core 2 in position, I arrange the concrete structure 4 to continue along the gutter in the ground, of the shape forming the base of said concrete structure, as shown by Fig. 1. After this I place the end of the core slightly into the end of the previously cast structure of concrete and then, after inflating the core I commence to fill the gutter in the ground to the desired depth of concrete as before stated, so that the whole structure is finished ready for the filling in of earth or covering the space in which the concrete lies, as circumstances require.

If the completed concrete structure encircling the core requires to be reinforced I can reinforce it circumferentially by the addition of a coiled strip of wire 6 which extends lengthwise the core and surrounds same, care being taken that the said coil of wire is embedded in the base, side walls and cover of the concrete structure as is shown by Fig. 1.

Provided the concrete structure, as shown at 4a in Fig. 2, requires further reinforcement I can make use of a series of cradles 7 into which take the longitudinal wires 8 so that said wires 8 may be laid within the concrete in a manner well known to extend the full length of same or any part thereon as may be required.

The other members 7a for supporting the wires 8 towards the upper part of the structure may be made use of and may, together with said wires 8, be left within the concrete structure.

When making a core to form an open space within a concrete structure as is shown by Figs. 3, 4 and 5 of the drawings I can make use again of the inner tube 2 of india-rubber which I fold upon itself to form three sections d, e and f. Over the tube 2 I place a cover 3 and this cover 3 I form by weaving or superposing two of the flexible fabrics upon each other and stitching or otherwise securing them along their outermost edges $d^1$ and $f^1$ and along the two edges $e^1$ and $e^2$ as far as the extent of the tube 2 reaches within the other portion e of the cover 3.

The tube of india-rubber 2 is inserted into the portion d of the cover 3 by inserting a thin bar of metal through same along the part d. The cover 3 has its outer ends at $d^2$ and $e^2$ closed by stitching or otherwise, and the insertion of the tube 2 therein is effected by placing its outer end into the section d of the tube a and inserting a lacing bar through an opening made in the outer end $d^2$ of said tube, its insertion being so far extended that the end of the tube 2 may be fixed to it. The metal bar is then withdrawn to bring the tube 2 beyond the end of the part e of the tube 3. The metal bar is then removed and is reinserted along the end of the cover 3 to be again attached to the tube 2. This is then drawn into the end portion of the cover 3 and the bar detached so that it may be inserted into the end of the part f of the cover 3 to withdraw the tube out of the open end of the part f. In like manner the tube 2 is bent over and the metal bar is inserted to pass again through the end part of the cover 3 to reach and draw within it the outermost closed end of the tube 2 to lie within the full length of the part e of the cover 3. The openings through the cover 3 for the insertion of the operating metal bar as stated are then repaired.

To complete the construction of the core I add a further outer covering flexible member 5 which is of the right dimensions to enable it to take over the whole outer surface of the covering 3. This outer covering 5 is for the purpose of facilitating its removal and the removal of all the parts it contains, as is hereinafter explained.

The inner cover 3 is formed to have the three parts d, e and f in the relative positions shown, in order to restrain the innermost tube 2 of india-rubber from assuming a cylindrical shape when inflated, but allowing it to assume the form somewhat as is indicated by Figs. 5 and 6, while the other covering tube of inextensible but flexible material is permitted to be distended by the pressure of inflation to form the upper and lower faces flat and even, while their edges are of semi-cylindrical shape.

It is obvious that where strength is required, or weight has to be resisted, then the flexible coverings 3, 3a may be increased in number or thickness, while where the increased thickness of concrete block requires a core of larger thickness or other difference in shape, then the central part e of the cover 3 and the other covers 3a and 5 have to be of larger width to allow the whole core to be distended to the shape somewhat as shown by Fig. 6. In the molding of the block of concrete or monolith within a box 20 (as shown by Fig. 3) I arrange the ends of the core to take through a detachable stop piece 21 (preferably of wood) which has to be removed when taking the core from its position within the molded concrete.

When I desire to form a wall or structure (as shown by Figs. 7 and 8) I may use vertical planks or battens of timber 13 which are fixed in position on the ground to stand erect so that they may carry metal supports 14. Between these series of planks 15, mounted upon the battens or upright structures 13, I may suspend series of cores 16 to be supported in position by a cross bar 17 so that they will extend between the wall formed or produced by concrete filling the space along each side of the cores 16, and around, as well as between, the spaces $s$ (which will afford binding means for the structure) in order to form the wall continuous but in sections as desired, in order that when the cores are deflated and withdrawn the structure is completed.

When it is desired to use additional binding means to retain the outer surfaces of the wall with the space $s$ between them, I employ binding pieces $t$ which I insert as shown by Fig. 8 so that they will extend from being embedded in the wall at one side to be embedded also in the wall opposite, and any desirable position may be selected for placing the series of these cross binding parts $t$, either vertically or laterally the appropriate distance apart.

When I make use of a series of cores 3 (shown by Fig. 9) for forming a floor 31 and a ceiling 32 I may arrange them in pairs or in larger numbers to extend between the floor and the ceiling as shown by said figure, and when so arranged I leave near the edge (where they have to be withdrawn from their positions) oval openings which are sufficient to permit the deflated core to be withdrawn from them. In this case the cores 3 are of any shape formed most suitable, somewhat as is shown by the drawings, so that the said openings 30, when made through the concrete forming the floor 31, may be made narrow enough and yet broad enough to permit the withdrawal of said cores 3 through them after said cores have been deflated.

When the cores have been withdrawn and the concrete thoroughly set and hardened the openings leading to the cavities vacated by the cores may be filled up to leave the floor in a finished condition.

Figure 10:
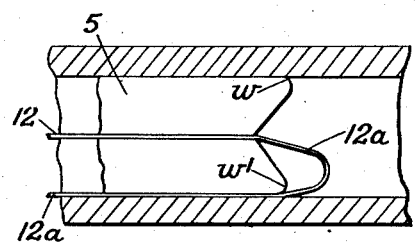
Fig. 10 is a diagrammatical section showing how the cover may be withdrawn from its position in a molded article.

As is hereinbefore stated I make use of a detachable cover 5 throughout all the formations of concrete structures within which a core 3 is employed, so that I may withdraw said covering 5 from its position when all the other parts have been removed to liberate it to be so withdrawn by the employment of a tape or cord 12 which may extend longitudinally through the structure as shown by Fig. 10.

When the cord 12 is being used to withdraw the cover 5 from its said position it carries another cord 12a inwardly which loosely drags behind so that when the core has been fully withdrawn by turning it from the outside to the inside the tape 12a will follow said turning action and will therefore remain on the inside of the cover 5. By these means it may be possible to replace the cover 5 on its core that has been withdrawn by acting upon it with the tape 12a and inserting it at the end where the tape 12 reaches, then by withdrawing the tape 12a the functions of said withdrawal cause the tape 12 to return and bring the core to the inside of the cover 5. The turning actions at the points $w$ and $w^1$ of the cover 5 make the detachment of said cover from the adhesive actions of the concrete more easily executed. Such being the nature and object of my said invention, what I claim is:—

1. A core for molding hollow concrete articles, which comprises an elongated inflatable member, said member being bent so as to have a plurality of sections thereof disposed side by side, an inelastic flexible covering for each said section of said member, and an additional covering enveloping the entire bent member.

2. A core for molding hollow concrete articles, which comprises an elongated inflatable member, said member being bent so as to have a plurality of sections thereof disposed side by side, an inelastic flexible covering for each said section of said member, and an additional covering enveloping the entire bent member, said additional covering having a strand secured to an end thereof and extending loosely through said additional covering to the other end thereof to facilitate removal of said additional covering from the molded article.

3. A core for molding hollow concrete articles, which comprises a tube of india-rubber bent upon itself so as to have a plurality of parallel sections, an inner cover of woven material enveloping said bent tube, the top and bottom of said cover being stitched together between the parallel sections of the tube, and a second cover of flexible but inextensible material enveloping said tube and inner cover.

CHARLES BERNARD MATHEWS.